United States Patent
Doshi et al.

(10) Patent No.: US 9,389,976 B2
(45) Date of Patent: Jul. 12, 2016

(54) DISTRIBUTED PERSISTENT MEMORY USING ASYNCHRONOUS STREAMING OF LOG RECORDS

(71) Applicant: Intel Corporation, Santa Clara, CA (US)

(72) Inventors: Kshitij A. Doshi, Chandler, AZ (US); Rahul Khanna, Portland, OR (US); Minh T. Le, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 14/248,913

(22) Filed: Apr. 9, 2014

(65) Prior Publication Data

US 2015/0293820 A1 Oct. 15, 2015

(51) Int. Cl.
*G06F 11/16* (2006.01)
*G06F 11/14* (2006.01)
*G06F 11/20* (2006.01)

(52) U.S. Cl.
CPC .......... *G06F 11/2097* (2013.01); *G06F 11/203* (2013.01); *G06F 11/1482* (2013.01); *G06F 11/2048* (2013.01); *G06F 2201/84* (2013.01); *G06F 2201/855* (2013.01); *G06F 2201/87* (2013.01)

(58) Field of Classification Search
None
See application file for complete search history.

(56) References Cited

U.S. PATENT DOCUMENTS

| | | | |
|---|---|---|---|
| 7,653,668 B1* | 1/2010 | Shelat | G06F 11/2094 707/610 |
| 2013/0013899 A1* | 1/2013 | Barton | G06F 9/466 712/220 |
| 2014/0115251 A1* | 4/2014 | Belluomini | G06F 12/0808 711/113 |

* cited by examiner

*Primary Examiner* — Brian Peugh
*Assistant Examiner* — Tracy Chan
(74) *Attorney, Agent, or Firm* — Barnes & Thornburg LLP

(57) ABSTRACT

Technologies for distributed durable data replication include a computing device having persistent memory that stores a memory state and an update log. The computing device isolates a host partition from a closure partition. The computing device may sequester one or more processor cores for use by the closure partition. The host partition writes transaction records to the update log prior to writing state changes to persistent memory. A replication service asynchronously transmits log records to a remote computing device, which establishes a replica update log in persistent memory. If the host partition fails, the closure partition transmits remaining log records from the update log to the remote computing device. The update log may be quickly replayed when recovering the computing device from failure. The remote computing device may also replay the replica update log to update a remote copy of the state data. Other embodiments are described and claimed.

25 Claims, 8 Drawing Sheets

DISTRIBUTED PERSISTENT MEMORY USING ASYNCHRONOUS STREAMING OF LOG RECORDS

BACKGROUND

Many typical applications executing in computing clusters, including cloud computing clusters, require a high level of availability, redundancy, or other measures of robustness. In such applications, state data is typically propagated throughout the computing cluster to prevent introducing a single node as a point of failure. For example, business-critical applications such as sales and customer billing systems typically must be failsafe against a single point of failure. A node in a computing cluster may be brought down due to any combination of hardware failure, software failure, network failure, power failure, or other unplanned outage. However, software failures (including software bugs, software misconfigurations, crashes due to transient hardware errors or power failures, and all other software failures) are typically more common than any other failure source.

In some high-availability systems, application state may be propagated through a computing cluster through synchronous update messages sent between all of the nodes of the cluster. Additionally or alternatively, in some systems the application state may be synchronously logged to global or shared storage such as a storage area network or network attached storage volume. In such applications, synchronization between nodes and/or shared storage may limit application performance.

Some computing systems include persistent memory, which may be byte-addressable, high-performance, non-volatile memory. Persistent memory may provide performance comparable to traditional volatile random access memory (RAM) while also providing data persistence. In some applications, persistent memory may allow for durable data updates within a node without waiting for storage input/output (I/O) actions against local storage devices and without converting data from in-memory formats to formats suitable for on-disk storage. However, high-availability applications using persistent memory may still require synchronous updates to other nodes and/or shared storage.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
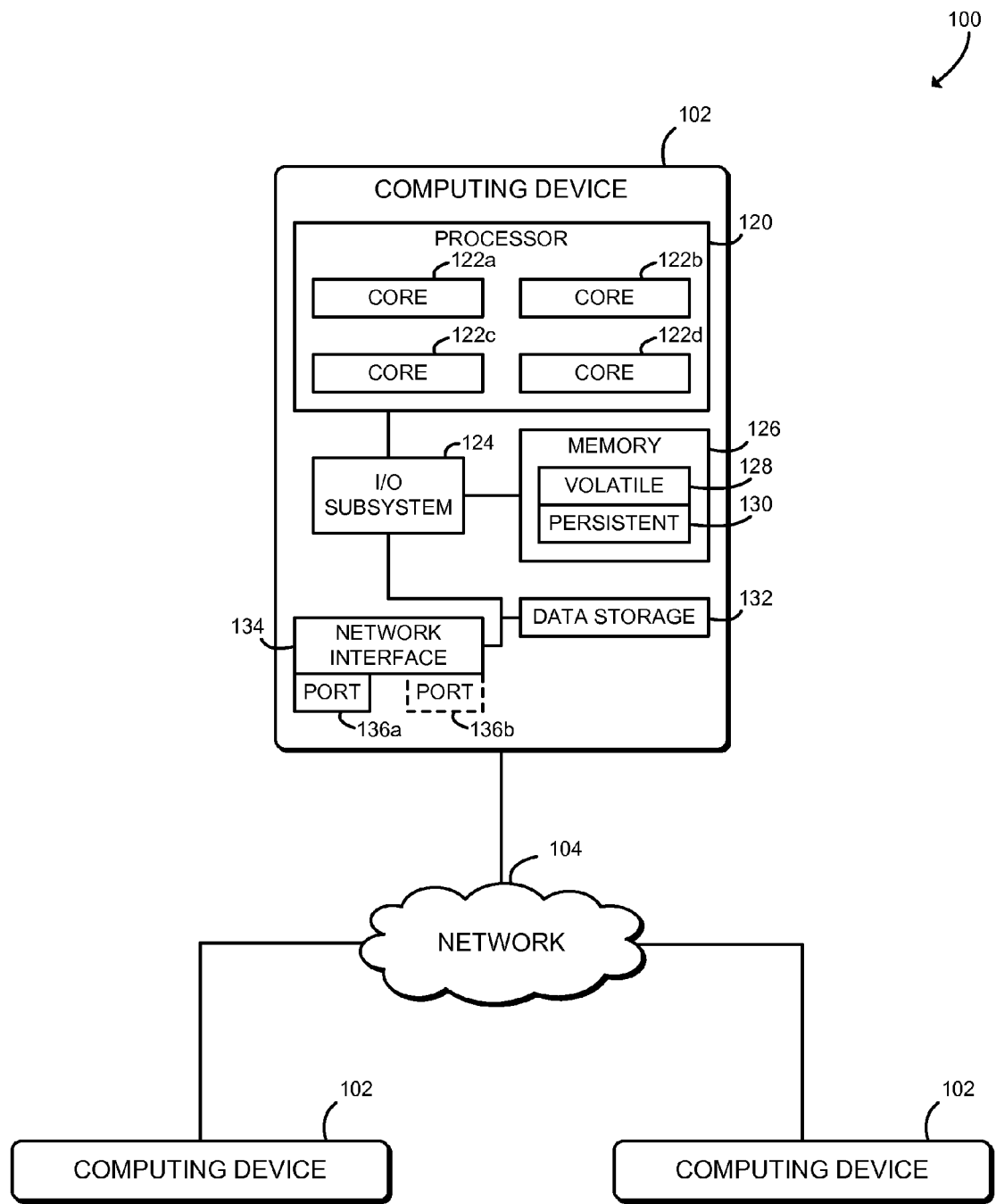
FIG. 1 is a simplified block diagram of at least one embodiment of a system for high-availability distributed persistent memory.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for high-availability distributed persistent memory includes a number of computing devices 102 in communication over a network 104. In use, as discussed in more detail below, each computing device 102 may establish two isolated computing domains: a host partition and a closure partition. The host partition may execute host applications, a host operating system, and/or a virtual machine monitor. The host partition monitors for any updates to persistent memory and, prior to committing the updates to persistent memory, logs the updates to a transaction log that is also stored in persistent memory. A transaction may be any set of operations that result in a change of state of an application that needs to be reflected on a durable medium such as a disk or persistent memory. The transaction log records updates to application state on a durable medium for the purpose of recovering such updates in the event that an application is forced to suspend before it has had an opportunity to commit the data changes made by a transaction, so that the recovered changes may be reapplied to the state of the application in a session subsequent to such a suspension of the application. Contemporaneously, the computing device 102 asynchronously streams transaction log records to one or more other remote computing devices 102 of the system 100, which in turn replay the log records to update a remote copy of the persistent memory state. If the host partition crashes or becomes unresponsive, the closure partition transmits all remaining records in the transaction log to the remote computing devices 102, and may restart the computing device 102. Particular embodiments of techniques for isolating the host partition and the closure partition are further described below. The illustrative system 100 includes a number of homogeneous computing devices 102; however, in some embodiments the system 100 may include other devices such as dedicated backup/high availability/disaster recovery devices.

Logging persistent memory state changes in a persistent memory transaction log prior to committing the persistent memory state changes may improve data consistency within the persistent memory and may allow for quick recovery of completed and/or partially completed transactions after hardware and/or software crashes or other failures. Streaming the transaction log records asynchronously to the remote computing devices 102 may allow for persistent memory state to be propagated through the system 100 within a bounded time period, without limiting performance of the host partition. Of course, the performance benefits of asynchronously streaming log records may not apply to strict transactions, for example those transactions that by definition must commit changes to a global location prior to being released. Upon failure of the host partition, fast transmission of the remainder of the transaction log by the closure partition may improve consistency, robustness, and durability of the remote copies of the persistent memory. Because software faults or other transient faults that disable only the host partition are much more common than hardware faults that disable the entire computing device 102, the closure partition may improve data durability and correctness of the system 100.

As further described below, the host and the closure partitions are configured to propagate information from a transaction update log 226 to a remote computing device 102b on a frequent but asynchronous basis so that the volume of information in the update log 226 that remains to be propagated to at least one remote device 102b at any time does not exceed a predetermined amount. Limiting the size of such a residual update log, the computing device 102 is designed to ensure that it can complete the transmission of the residual update log within an allowable grace interval (e.g., a few milliseconds or a few tens of milliseconds) at any time.

Each computing device 102 may be embodied as any type of computing device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. As shown in FIG. 1, the computing device 102 includes a multi-core processor 120, an input/output subsystem 124, a memory 126, a data storage device 132, and network interface 134. Of course, the computing device 102 may include other or additional components, such as those commonly found in a server device (e.g., various input/output devices), in other embodiments. Additionally, in some embodiments, one or more of the illustrative components may be incorporated in, or otherwise form a portion of, another component. For example, the memory 126, or portions thereof, may be incorporated in one or more processor 120 in some embodiments.

The processor 120 may be embodied as any type of processor capable of performing the functions described herein. The illustrative processor 120 is a multi-core processor, however in other embodiments each processor 120 may be embodied as a dual or multi-core processor(s), digital signal processor, microcontroller, or other processor or processing/controlling circuit. The illustrative processor 120 includes four processor cores 122, each of which is an independent processing unit capable of executing programmed instructions. Although the illustrative processor 120 includes four processor cores 122a through 122d, the processor 120 may include a fewer or greater number of processor cores 122 in other embodiments.

The memory 126 may be embodied as any type of volatile or non-volatile memory or data storage capable of performing the functions described herein. In operation, the memory 126 may store various data and software used during operation of the computing device 102 such as operating systems, applications, programs, libraries, and drivers. The memory 126 further includes volatile memory 128 and persistent memory 130. The volatile memory 128 may be embodied as traditional RAM, meaning that any data contained in the volatile memory 128 is lost when power is removed from the computing device 102 and/or the volatile memory 128. The persistent memory 130 may be embodied as any byte-addressable, high-performance, non-volatile memory. For example, the persistent memory 130 may be embodied as battery-backed RAM, phase-change memory, memristor-based memory, or other types of persistent memory. The persistent memory 130 may include programs and data similar to the volatile memory 128; however, the contents of the persistent memory 130 are retained for at least some period of time when power is removed from the computing device 102 and/or the persistent memory 130.

The memory 126 is communicatively coupled to the processor 120 via the I/O subsystem 124, which may be embodied as circuitry and/or components to facilitate input/output operations with the processor 120, the memory 126, and other components of the computing device 102. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 102, on a single integrated circuit chip. In some embodiments, the I/O subsystem 124 may include a processor memory bus in addition to other buses that permit direct memory access between the memory 126 and data storage devices 132 or network interface 134.

The data storage device 132 may be embodied as any type of device or devices configured for short-term or long-term storage of data such as, for example, memory devices and circuits, memory cards, hard disk drives, solid-state drives, or other data storage devices. Access to the data storage device 132 may be much slower than to the persistent memory 130. Additionally, the data storage device 132 may be accessed through a block device, file system, or other non-byte-addressable interface.

The network interface 134 of the computing device 102 may be embodied as any communication circuit, device, or collection thereof, capable of enabling communications between the computing device 102 and other remote devices over the network 104. The network interface 134 may be configured to use any one or more communication technology (e.g., wired or wireless communications, Ethernet, Bluetooth®, Wi-Fi®, WiMAX, Infiniband, etc.) and associated protocols (e.g., TCP, UDP, iWARP, RDMA, etc.) to effect such communication. The illustrative network interface 134 is embodied as an Ethernet adapter including a single port 136. In some embodiments, the network interface 134 may include additional ports, for example two ports 136a, 136b. Each of the ports 136a, 136b allows independent access to remote hosts over the network 104, and the ports 136 may be sequestered, partitioned, and/or otherwise isolated from each other. In other embodiments, the network interface 134 may be embodied as a virtual-machine-device queue-enabled network interface card having at least two virtual network interfaces, may be embodied as a pair of physical network adapters, or may be embodied as any other network interface allowing sequestered and/or independent access to the network 104.

As discussed in more detail below, the computing devices 102 are configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications among the devices of the system 100. In particular, the network 104 may also include components that provide a distributed or clustered storage system such as GPFS, HDFS, Ceph, NFS, etc.

Figure 2:
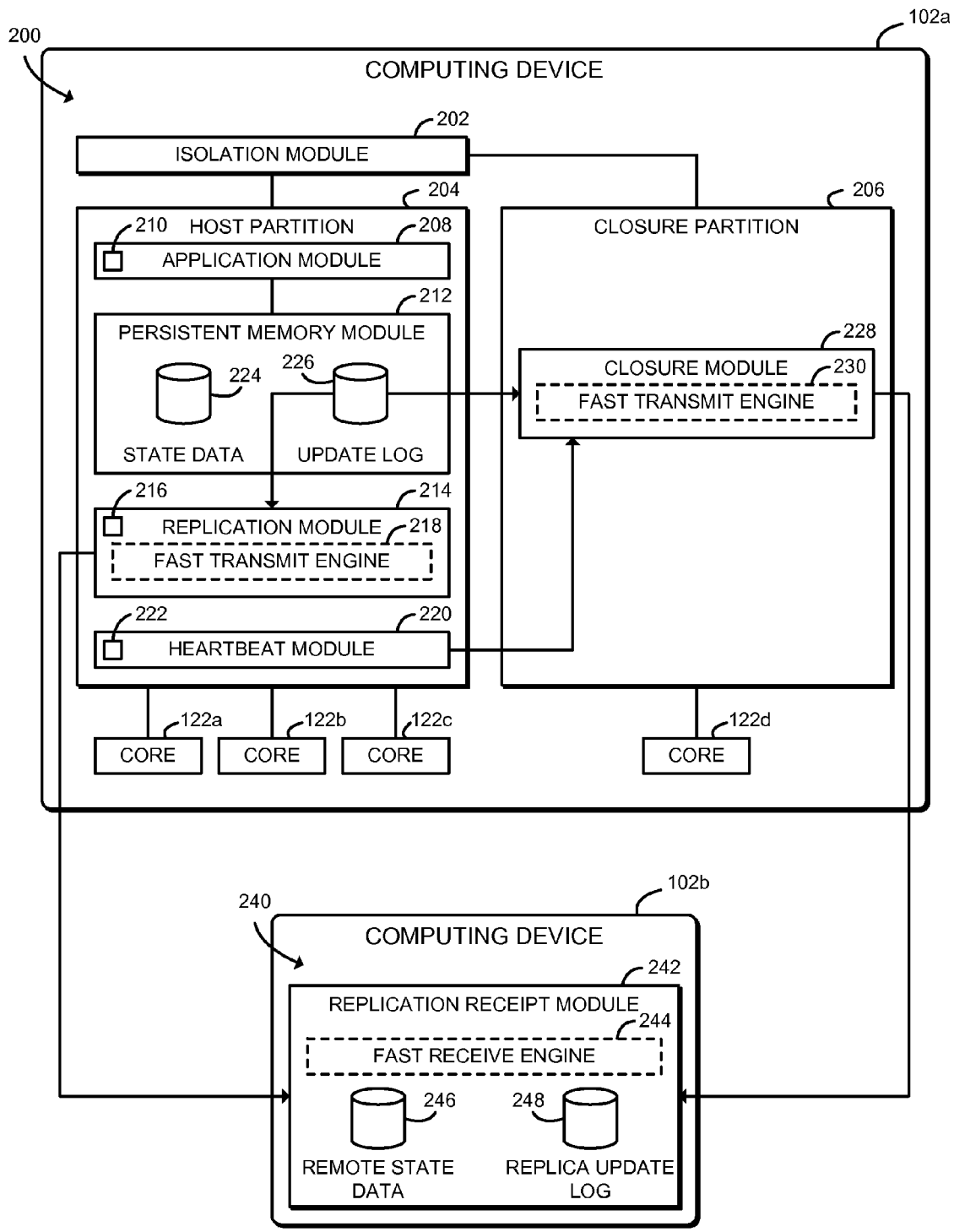
FIG. 2 is a simplified block diagram of at least one embodiment of various environments that may be established by the system of FIG. 1.

Referring now to FIG. 2, in an illustrative embodiment, a computing device 102a establishes an environment 200 during operation. The illustrative environment 200 includes an isolation module 202, a host partition 204, and a closure partition 206. The various modules of the environment 200 may be embodied as hardware, firmware, software, or a combination thereof.

The isolation module 202 is configured to isolate the closure partition 206 from the host partition 204. Isolating the partitions 204, 206 may establish strict computational and/or storage isolation and access control that may be enforced by hardware and/or firmware of the computing device 102a. Thus, isolation may prevent uncontrolled sharing of resources between the host partition 204 and/or the closure partition 206. However, the sequestration is asymmetric, meaning that the closure partition 206 has at least read-only access to segments of the persistent memory 130. The isolation module 202 may use hardware, pre-boot firmware, processor boot vectors, or any other technique to isolate components of the computing device 102a without relying on a virtual machine manager (VMM) or operating system. Such low-level isolation may thus tolerate software faults within the VMM and/or operating system.

The host partition 204 is assigned a subset of the hardware resources of the computing device 102a. In the illustrative embodiment, the host partition 204 has been assigned the processor cores 122a, 122b, 122c. Thus, to any modules of the host partition 204, the computing device 102a may be presented and/or detected as having a three-core processor 120. The host partition 204 further includes an application module 208, a persistent memory module 212, a replication module 214, and a heartbeat module 220. Of course, in other embodiments, other or additional resources may be assigned to the host partition 204.

The application module 208 is configured to execute an application workload on the computing device 102a. The application module 208 may include a virtual machine monitor, hypervisor, general operating system, specialized operating system, database, application software, or other components to perform computations and/or provide services. The application module 208 further generates or requests changes to the state of the persistent memory 130, for example to store application data. In particular, the application module 208 may include an application thread 210 that generates persistent memory state updates.

The persistent memory module 212 is configured to maintain state data 224 and an update log 226 in the persistent memory 130. The state data 224 may be embodied as any values, records, objects, or other data stored in the persistent memory 130 or otherwise used by the application module 208. For example, the state data 224 may be embodied as an in-memory database that uses the persistent memory 130. The update log 226 may be embodied as any data structure capable of logging updates to the state data 224. The update log 226 may be embodied as a small fraction of the entire persistent memory 130. After a crash, the update log 226 may be replayed to complete updates of the state data 224 or otherwise used to reconstruct a correct state of the state data 224. The persistent memory module 212 is configured to write transaction records corresponding to changes in the state data 224 to the update log 226.

The replication module 214 is configured to transfer records from the update log 226 to one or more remote computing devices 102b. The replication module 214 may include a replication thread 216 to perform the transfers. Thus, the replication module 214 may transfer records asynchronously or otherwise be independent and/or decoupled from the application module 208 and/or the application thread 210. In some embodiments, the replication module 214 may include a fast transmit engine 218 to allow log records to be transferred within a short time period required for high availability (i.e. a fraction of a second, or within hundreds of microseconds). For example, the fast transmit engine 218 may be embodied as the Intel® Data Plane Development Kit (DPDK).

The heartbeat module 220 is configured to generate a heartbeat signal that may be detected by the closure partition 206. The closure partition 206 may use the heartbeat signal to determine whether the host partition 204 is active (e.g., has not crashed). The heartbeat module 220 may use any technique to generate the heartbeat signal including, for example, writing data to a pre-defined shared memory address. The functions of the heartbeat module 220 may be performed by a heartbeat thread 222 independent of the application module 208 and/or the replication module 214.

The closure partition 206 is assigned a subset of the hardware resources of the computing device 102a. In the illustrative embodiment, the closure partition 206 has been assigned the processor core 122d. Thus, to any modules of the closure partition 206, the computing device 102a may be presented and/or detected as having a single-core processor 120. The closure partition 206 further includes a closure module 228. Of course, in other embodiments, other or additional resources may be assigned to the closure partition 206.

The closure module 228 is configured to determine whether the host partition 204 is active and transmit the remaining records of the update log 226 to the remote computing device 102b when the host partition 204 is not active. Additionally, the closure module 228 may be configured to restart the computing device 102a after transmitting the update. The closure module 228 may further include, or be embodied as a real-time operating system (RTOS). The RTOS may be embodied as a simple execution environment designed for robust and deterministic execution. The closure module 228 may be configured to remove or reduce the power supplied to the volatile memory 128 and/or other resources that are not used by the closure partition 206, to allow the closure partition 206 to transfer log records on available backup power (e.g., UPS, battery backup, capacitive storage, or other reserve power). Additionally or alternatively, in some embodiments the closure module 228 may include a fast transmit engine 230 to allow log records to be transferred within a short time period required for high availability. Similar to the replication module 214, the fast transmit engine 230 may be embodied as the Intel® DPDK. Although in the illustrative embodiment the replication module 214 is established by the host partition 204, in other embodiments the replication module 214 may be established by the closure partition 206. In those embodiments, the functions of the replication module 214 and the closure module 228 may be wholly or partially combined.

Still referring to FIG. 2, in an illustrative embodiment, the computing device 102a may be in communication over the network 104 with a remote computing device 102b that receives the transferred log records. The remote computing device 102b may establish an environment 240 during operation. The illustrative environment 240 includes a replication receipt module 242. The various modules of the environment 240 may be embodied as hardware, firmware, software, or a combination thereof.

The replication receipt module 242 is configured to receive transaction records corresponding to persistent memory state changes from the computing device 102a and store those transaction records in a replica update log 248. In some embodiments, the replication receipt module 242 may include a fast receipt engine 244 to allow log records to be received within a short time period required for high availability. Similar to the replication module 214 and/or the closure module 228, the fast transmit engine 230 may be embodied as the Intel® DPDK. The replica update log 248 is established within the persistent memory 130 of the remote computing device 102b and mirrors, copies, or otherwise replicates the update log 226 of the computing device 102a. In some embodiments the replica update log 248 may be an exact copy of the update log 226. Additionally or alternatively, in some embodiments the replica update log 248 may be a modified version of the update log 226, for example, having memory pointers, base addresses, page tables, or other references adjusted for use by the remote computing device 102b.

The replication receipt module 242 is further configured to replay the transaction records of the replica update log 248 to apply the state changes to remote state data 246. The remote state data 246 may be embodied as any copy, duplicate, backup version, or other data reflecting the state data 224 of the computing device 102a. The remote state data 246 may be established by the persistent memory 130 or the data storage device 132 of the remote computing device 102b. The replication receipt module 242 is configured to remove log records from the replica update log 248 after updating the remote state data 246, and to perform any other maintenance required to process the replica update log 248. The replication receipt module 242 may be established by any partition, virtual machine monitor (VMM), hypervisor, operating system (OS), or other control system of the remote computing device 102b. For example, the replication receipt module 242 may be established by a host partition or an isolated closure partition of the remote computing device 102b (not shown).

Figure 3:
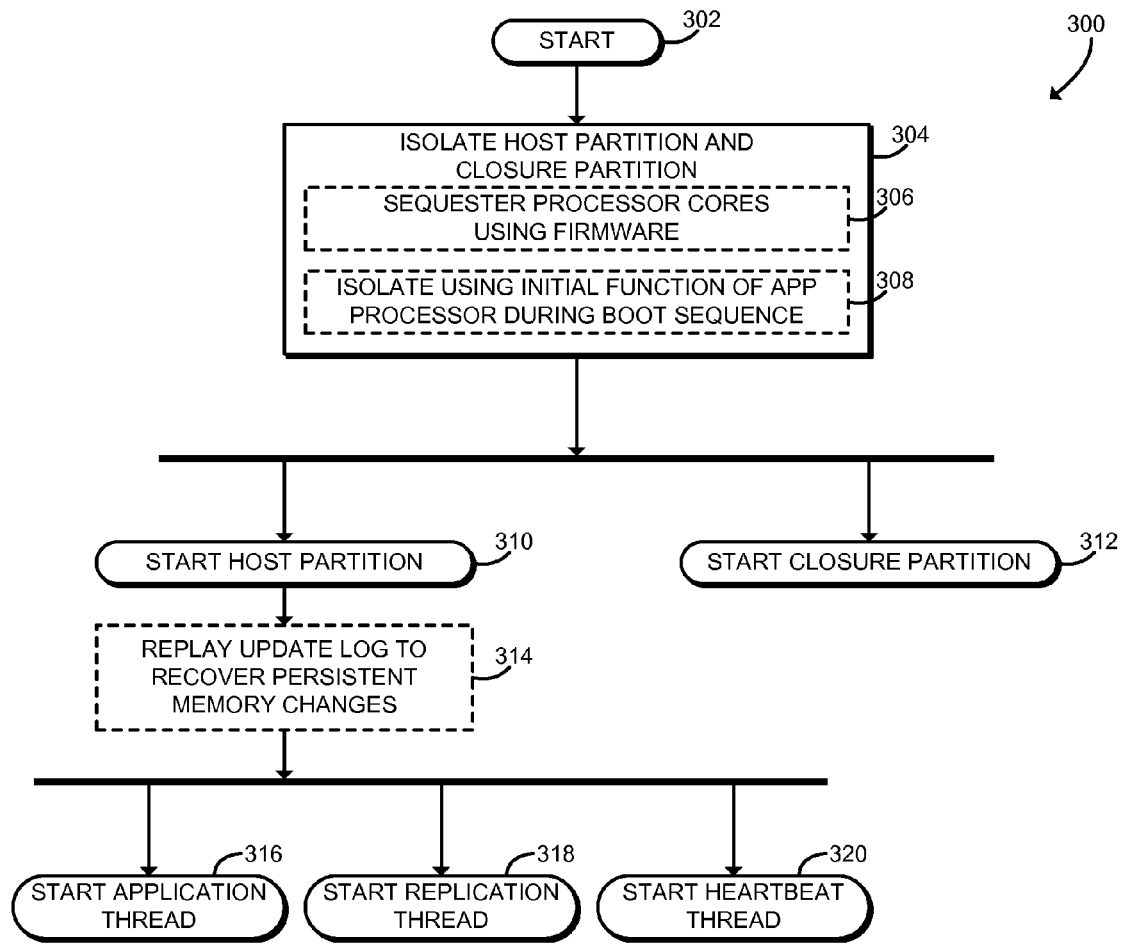
FIG. 3 is a simplified flow diagram of at least one embodiment of a method for persistent memory replication that may be executed by a computing device of the system of FIGS. 1 and 2.

Referring now to FIG. 3, in use, a computing device 102a may execute a method 300 for persistent memory replication. The method 300 begins in block 302, in which the computing device 102a is started. The computing device 102a may be started in response to powering on the device, in response to a hard or soft reset, or in response to any other event causing the computing device 102a to start processing. The computing device 102a may be started in a mode allowing for complete control of the computing device 102a, including complete control of all hardware components and peripheral devices. For example, the computing device 102a may be started in a firmware execution environment prior to boot of any operating system, hypervisor, virtual machine monitor, or other control system of the computing device 102a.

In block 304, the computing device 102a isolates the host partition 204 and the closure partition 206. Isolating the host partition 204 and the closure partition 206 controls access to hardware resources of the computing device 102a, such as the processor cores 122, the memory 126, or the network interface 134. For example, the application module 208 of the host partition 204 may access certain processor cores 122 and may be denied access to other processor cores 122. Isolating the processor cores 122 establishes a strictly isolating computational partition (not a virtual partition) between subsets of the processor cores 122. For example, in some embodiments, the processor core 122d may be isolated from the processor cores 122a, 122b, 122c. The computing device 102a may assign a smaller subset of the processor cores 122 to the closure partition 206; for example, the processor core 122d may be assigned to the closure partition 206, and the processor cores 122a, 122b, 122c may be assigned to the host partition 204. Accordingly, after isolation, the closure partition 206 cannot be compromised or otherwise interfered with by data and/or processes of the host partition 204. It should be appreciated that the computing device 102a may similarly isolate any strictly isolatable processing resource in addition the processor cores 122, such as physical processors or hardware threads. In particular, if the computing device 102a has an auxiliary core that is specifically designed for very low power consumption (not shown), the isolation module 202 may alternatively isolate the auxiliary core. Certain hardware resources may be shared between the partitions 204, 206. For example, the host partition 204 and the closure partition 206 may share access to part or all of the persistent memory 130 and/or the network interface 134.

In some embodiments, in block 306, the computing device 102a may sequester certain processor cores 122 for the host partition 204 and the closure partition 206 using firmware of the computing device 102a. For example, firmware may maintain one or more data tables describing hardware resources available in the computing device 102a, including the number of available processor cores 122. In that example, the firmware may allow processes executed by the processor core 122d to view the computing device 102a as having a single-core processor 120, and the firmware may allow processes executed by the processor cores 122a, 122b, 122c to view the computing device 102a as having a three-core processor 120.

In some embodiments, in block 308, the computing device 102 may isolate certain processor cores 122 for the host partition 204 and the closure partition 206 using the initial function executed by one or more application processors during the boot sequence. The initial function may be a software function executed early in the boot process. Typically, as part of the boot process, the computing device 102a identifies one processor core 122 (e.g., processor core 122a) as the boot processor and the rest of the processor cores 122 (e.g., processor cores 122b, 122c, 122d) as secondary processors, also known as application processors. Typical operating systems boot under the control of the boot processor core 122a, and the application processor cores 122b, 122c, 122d execute an identical initial function to yield, idle, or otherwise wait for instructions from the boot processor core 122a. In some embodiments, one of the application processor cores 122 (e.g., processor core 122d) may execute a different initial function from the other application processor cores 122 (e.g., processor cores 122b, 122c). In those embodiments, the isolated application processor core 122d may go on to execute software that is completely independent from the software executing on the other processor cores 122a, 122b, 122c, including an operating system kernel, mini-kernel, network kernel, application software, or other software.

After isolating the host partition 204 and the closure partition 206, the method 300 proceeds concurrently to blocks 310, 312. In block 310, the computing device 102a starts the host partition 204, and in block 314 the computing device 102a starts the closure partition 206. Each of the partitions 204, 206 may be started by starting an appropriate firmware boot process, operating system loader, or other method for starting a partition. After being started, each of the partitions 204, 206 may continue to run until the computing device 102a is powered down or reset. The partitions 204, 206 execute independently; therefore, as described further below, a crash or compromised state of one of the partitions 204, 206 does not affect the other partition.

After starting the host partition 204 in block 310, the method 300 proceeds to block 314. In some embodiments, in block 314 the computing device 102a may replay records of the update log 226 to update the state of the persistent memory 130. For example, after a transient power failure, software failure, system reset, or other unplanned stop of the host partition 204 and/or the computing device 102a, the computing device 102a may replay the update log 226 to recover uncommitted changes or otherwise ensure that the persistent memory 130 is in a consistent state. Rather than replaying all records of the update log 226, in some embodiments the computing device 102a may use the update log 226 to reconstruct a consistent state of the persistent memory 130, for example by selectively performing or rolling back certain state changes.

After replaying the update log 226 if necessary, the method 300 proceeds concurrently to blocks 316, 318, 320. In block 316, the computing device 102a starts one or more application threads 210, in block 318 the computing device 102a starts the replication thread 216, and in block 320 the computing device 102a starts the heartbeat thread 222. The threads 210, 216, 222 may be started by executing an operating system within a hypervisor, starting a process or a thread within an operating system, starting a software thread within an application, or through any other method for executing a concurrent stream of control within the host partition 204. During execution, the application thread 210 may log changes to the persistent memory 130 to the update log 226 and then commit changes to the persistent memory 130. One embodiment of a method that may be executed by the application thread 210 is further described below in connection with FIG. 4. The replication thread 216 may stream log records from the update log 226 to one or more remote computing devices 102b. One embodiment of a method that may be executed by the replication thread 216 is further described below in connection with FIG. 6. The heartbeat thread 222 may generate a heartbeat signal that can be detected by the closure partition 206. One embodiment of a method that may be executed by the heartbeat thread 222 is further described below in connection with FIG. 7. After being started, the threads 210, 216, 222 may execute within the host partition 204 until the computing device 102a is powered down or reset, or until a failure (e.g., software failure, transient hardware failure, etc.) causes execution of one or more of the threads 210, 216, 222 to stop.

Figure 4:
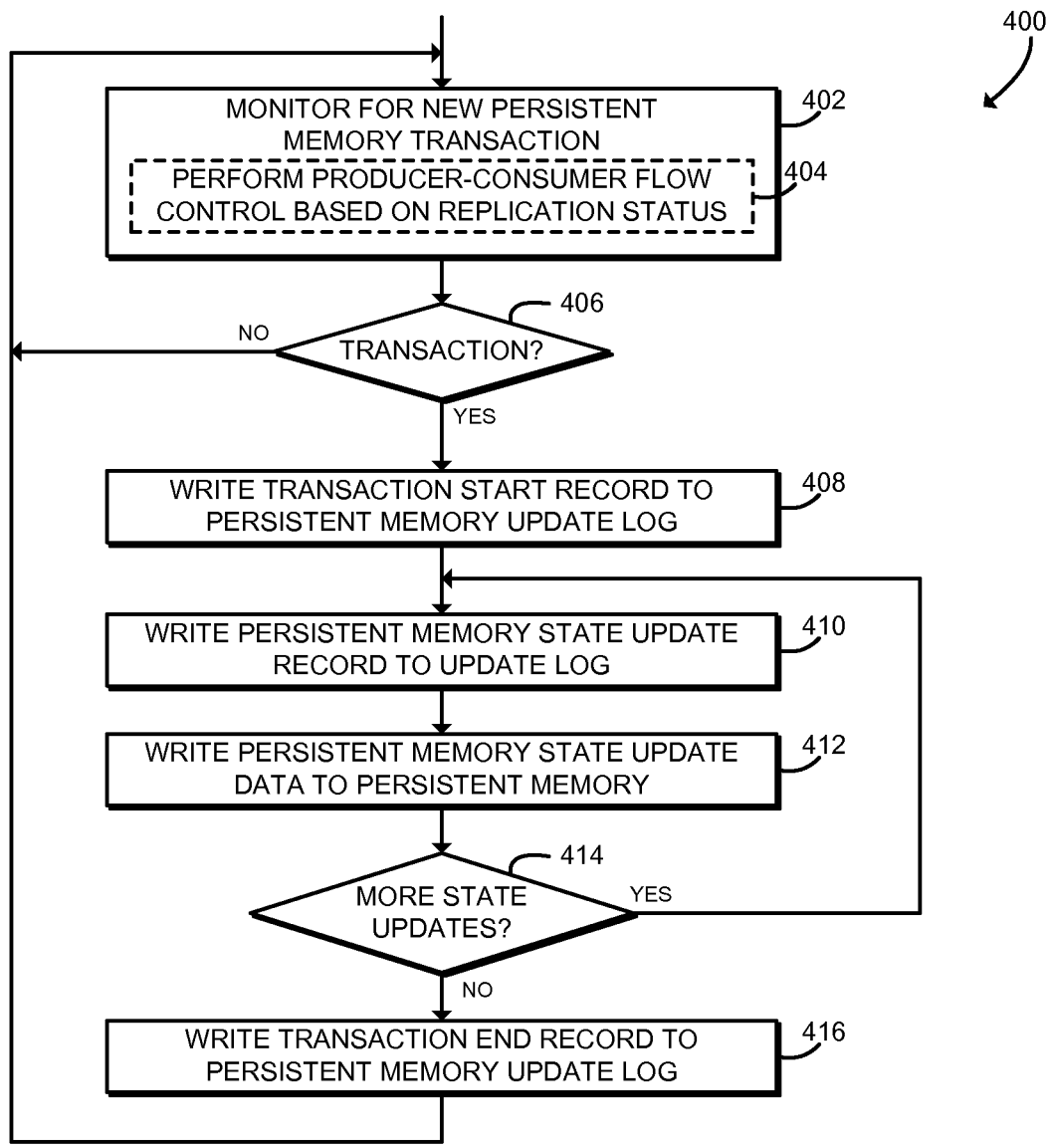
FIG. 4 is a simplified flow diagram of at least one embodiment of a method for updating data in persistent memory that may be executed by the computing device of the system of FIGS. 1 and 2.

Referring now to FIG. 4, in use the computing device 102a may execute a method 400 for updating the state data 224 stored in the persistent memory 130. The method 400 is executed using the host partition 204 of the computing device 102a. The method 400 may be executed as part of application thread 210, by the application thread 210 through one or more interfaces, as an independent thread of execution, or through any other method of execution available within the host partition 204. Thus, in the illustrative embodiment the method 400 may be executed using the processor cores 122a, 122b, 122c. In block 402, the computing device 102a monitors for a new persistent memory 130 transaction. The persistent memory 130 transaction may be generated by an operating system, application, or other entity within the host partition 204 in order to update the state of the persistent memory 130. The computing device 102a may use any method to monitor for persistent memory 130 transactions, including establishing an interface for the operating system and/or applications to request a new transaction or intercepting attempted writes to the persistent memory 130.

In block 404, in some embodiments the computing device 102a may perform producer-consumer flow control based on the current replication status of the update log 226. In other words, the computing device 102a may wait, block, or otherwise throttle requests for new persistent memory 130 transactions in order to allow log records from the update log 226 to stream to the remote computing device 102b. In some embodiments, the computing device 102a may control the flow of new transactions to allow existing records in the update log 226 to be transmitted to the remote computing device 102b within a predetermined time limit, such as a high availability replication time limit guaranteed by the computing device 102a and/or the system 100. In some embodiments, the computing device 102a may control the flow of transactions simply by determining whether room exists in the update log 226 for new transactions; if not, the computing device 102a may pause, yield, or otherwise wait for records within the update log 226 to be transmitted. In block 406, the computing device 102a determines whether a transaction has been detected. If not, then the method 400 loops back to block 402. If a transaction has been detected, the method 400 advances to block 408.

In block 408, the computing device 102a writes a transaction start record to the persistent memory update log 226 stored in the persistent memory 130. The transaction start record may delineate the beginning of a transaction in the update log 226, record a transaction identifier in the update log 226, and otherwise record the beginning of the transaction. After or during the write of the transaction start record, the computing device 102a may update pointers, records, or other data structures required to keep the update log 226 consistent.

Figure 5:
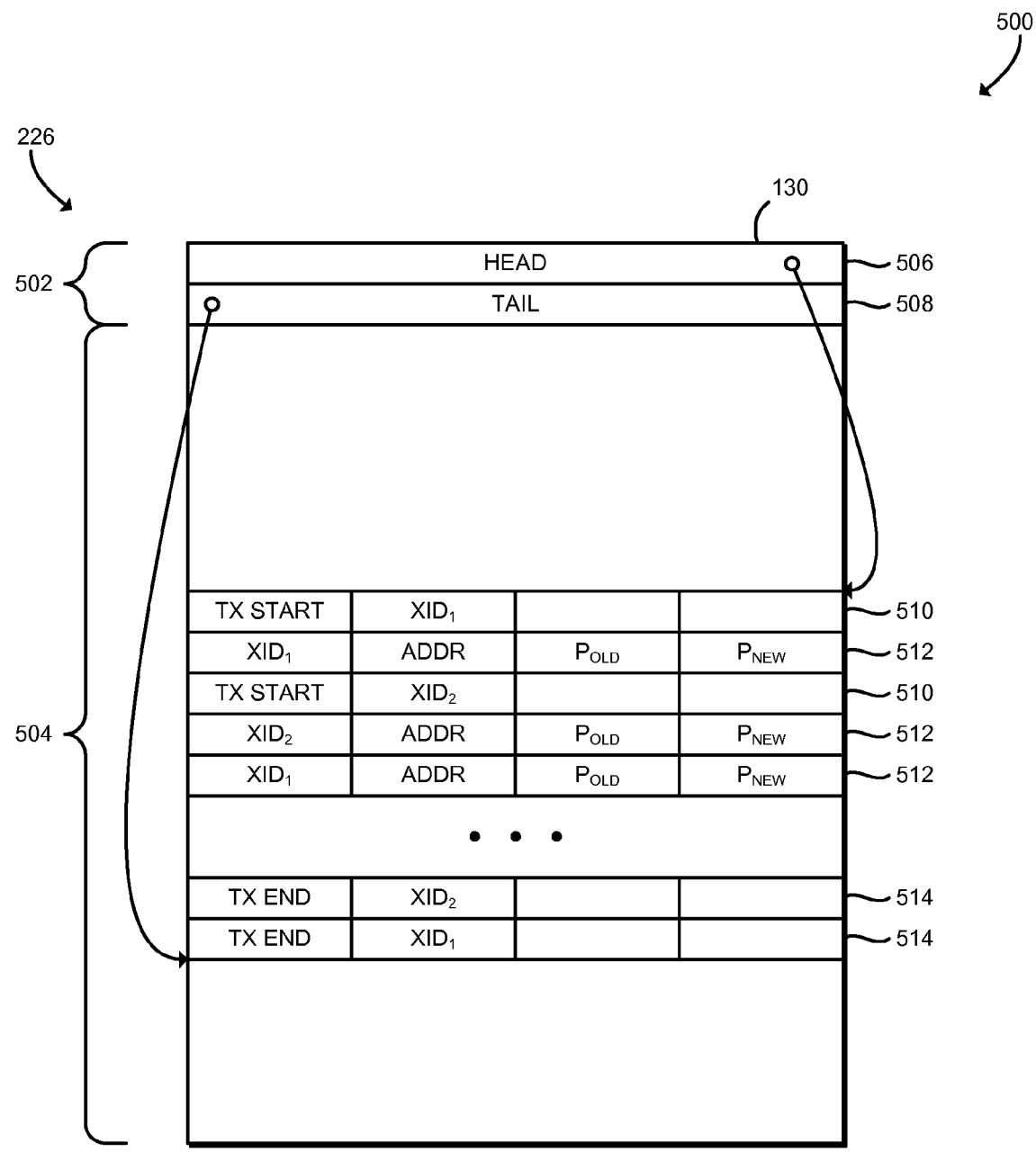
FIG. 5 is a schematic diagram of an example transaction log that may be maintained by the computing device of the system of FIGS. 1 and 2.

Referring now to FIG. 5, schematic diagram 500 illustrates one embodiment of an illustrative update log 226. As shown, the illustrative update log 226 is stored in a contiguous block of the persistent memory 130. The update log 226 may occupy only a relatively small portion of the total available persistent memory 130. The update log 226 includes two main parts: a header 502 and a data part 504. The data part 504 is embodied as a circular buffer including log records for the update log 226. Each log record is illustratively embodied as a block of memory including four elements (e.g., bytes, words, or other memory segments). The header 502 includes a head pointer 506 and a tail pointer 508 that mark the first and last log records, respectively. The illustrative update log 226 includes two transaction start records 510. Each transaction start record 510 includes a predetermined value TX START to mark the transaction start and a unique transaction identifier $XID_n$. In the illustrative embodiment, the computing device 102a may write a transaction start record 510 to the circular buffer 504 at the position of the tail pointer 508 and then increment the tail pointer 508 to its new position.

Referring back to FIG. 4, in block 410 the computing device 102a writes a persistent memory update record to the update log 226. The persistent memory update record corresponds to a change in the state of a location in the persistent memory 130 that may be requested or otherwise generated by an application of the host partition 204. The persistent memory update record includes all information required to replay or otherwise commit the change to persistent memory 130. For example, the persistent memory update record may include the values of a location in persistent memory 130 both before and after the change to the state of the persistent memory 130. Thus, because the update log 226 is itself stored in persistent memory 130, after a failure, the computing device 102a may use the persistent memory update record to ensure that values of the persistent memory 130 are correct and/or consistent.

Referring again to FIG. 5, the illustrative update log 226 includes three persistent memory update records 512. Each persistent memory update record 512 includes a transaction identifier $XID_n$, an address ADDR of a location within the persistent memory 130, an old value $P_{OLD}$ of the location ADDR within the persistent memory 130, and a new value $P_{NEW}$ of the location ADDR within the persistent memory 130. Similar to the transaction start record 510, the computing device 102a may write the persistent memory update record 512 at the current position of the tail pointer 508 and then increment the tail pointer 508 to a new position. As shown in illustrative update log 226, execution of the transactions may be interleaved, and the persistent memory update records 512 are associated with the correct transaction using the transaction identifiers $XID_n$. The illustrative update log 226 does not enforce thread-safety, conflict detection, or other concurrency control mechanisms; application and/or operating system software of the host partition 204 may provide such services.

Referring back to FIG. 4, in block 412, the computing device 102a writes persistent memory update data to the persistent memory 130. In other words, the computing device 102a updates the state data 224 stored in the persistent memory 130 to match the state change requested or otherwise generated by the host partition 204. After writing state data 224 to the persistent memory 130, the computing device 102a may return control to the applications or other entities of the host partition 204, to allow further processing. In block 414, the computing device 102a determines whether additional persistent memory 130 state updates remain. The computing device 102a may receive additional requests for state updates from the host partition 204, intercept attempted state updates from the host partition 204, or otherwise determine whether additional state updates need to be processed. If additional state updates need to be processed, the method 400 loops back to block 410. When the application thread 210 closes a transaction (e.g., completes the transaction), the method 400 advances to block 416.

In block 416, the computing device 102a writes a transaction end record to the update log 226. The transaction end record may delineate the end of a transaction in the update log 226, record the associated transaction identifier in the update log 226, and otherwise record the end of the transaction. The computing device 102a may write the transaction end record in response to a request to end the transaction received from the host partition 204 or through any other technique. After or during the write of the transaction end record, the computing device 102a may update pointers, records, or other data structures required to keep the update log 226 consistent. For example, referring again to FIG. 5, the illustrative update log 226 includes two transaction end records 514 corresponding to the two transaction start records 510. Each transaction end record 514 includes a predetermined value TX END to mark the transaction end and the associated unique transaction identifier $XID_n$. In the illustrative embodiment, the computing device 102a may write a transaction end record 514 to the circular buffer 504 at the position of the tail pointer 508 and then increment the tail pointer 508 to its new position. Referring back to FIG. 4, after writing the transaction end record, the method 400 loops back to block 402 to continue monitoring for new transactions.

Figure 6:
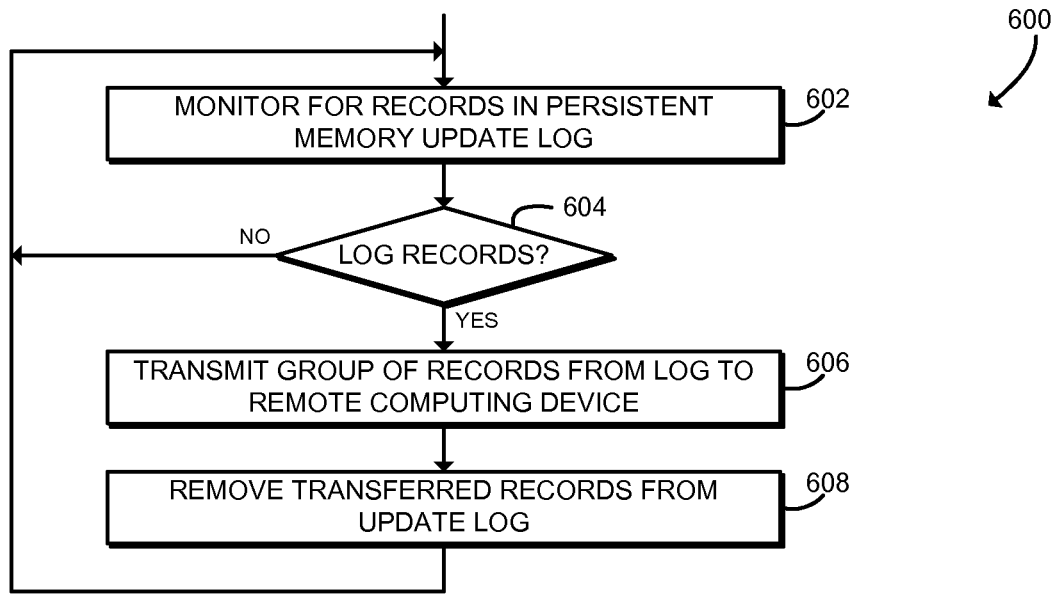
FIG. 6 is a simplified flow diagram of at least one embodiment of a method for replicating transaction log records to a remote computing device that may be executed by the computing device of the system of FIGS. 1 and 2.

Referring now to FIG. 6, in use the computing device 102a may execute a method 600 for streaming log records from the update log 226 to one or more remote computing devices 102b. In the illustrative embodiment, the method 600 is executed using the host partition 204 of the computing device 102a, for example by the replication thread 216. In some embodiments, the method 600 may be executed by a thread using the closure partition 206. In block 602, the computing device 102a monitors for records in the persistent memory update log 226. For example, the computing device 102a may monitor data structures associated with the update log 226 to determine whether any records have been added by the application thread 210, the persistent memory module 212, or other entities of the host partition 204. Referring again to FIG. 5, in the illustrative embodiment, the computing device 102a may analyze the head pointer 506 and the tail pointer 508 to determine whether log records exist within the data part 504. Referring back to FIG. 6, in block 604 the computing device 102a determines whether log records exist in the update log 226. If no records exist, the method 600 loops back to block 602. If records exist, the method 600 advances to block 606.

In block 606, the computing device 102a transmits a group of records from the update log 226 to one or more remote computing devices 102b. The computing device 102a may transmit one or more records in each group, and each group may include records forming part or all of one or more transactions. The number of records transferred may depend on the capabilities of the network interface 134, available bandwidth, and any other relevant parameters. The computing device 102a may transfer the records using a fast transmit engine such as a polling-based packet transport service of the host partition 204. For example, the computing device 102a may use the Intel® Data Plane Development Kit (DPDK) or other network engine to transmit the records. The fast transmit engine may reduce or eliminate in-memory copies, avoid interrupt servicing overhead, or perform other operations to increase the transmission speed and/or efficiency of the computing device 102a. Thus, the computing device 102a may transfer records to the remote computing device(s) 102b within a fraction of a second, allowing the computing device 102a to meet high-availability requirements.

In block 608, after transmitting the group of records, the computing device 102a removes the transferred records from the update log 226. The computing device 102a may update data structures related to the update log 226 to indicate that the records have been transferred, for example by advancing a head pointer. For example, referring again to FIG. 5, the computing device 102a may transfer a number of records starting at the head pointer 506. After transferring the records to the remote computing device(s) 102b, the computing device 102a may advance the head pointer 506 past the transferred records. Thus, by using a circular buffer, the computing device 102a may not physically allocate or deallocate memory when streaming log updates to the remote computing device(s) 102b. Additionally, removing log records after they have been replicated may improve performance of the computing device 102a when replaying the update log 226 to recover from a crash. Referring back to FIG. 6, after removing the records from the update log 226, the method 600 loops back to block 602 to continue monitoring for additional records in the update log 226.

Figure 7:
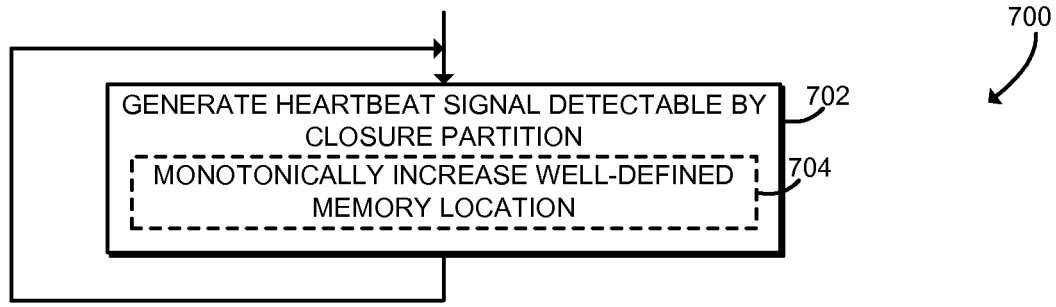
FIG. 7 is a simplified flow diagram of at least one embodiment of a method for generating a heartbeat signal that may be executed by the computing device of the system of FIGS. 1 and 2.

Referring now to FIG. 7, in use the computing device 102a may execute a method 700 for generating a heartbeat signal. The method 700 is executed using the host partition 204 of the computing device 102a, for example by the heartbeat thread 222. In block 702, the computing device 102a generates a heartbeat signal that is detectable by the closure partition 206. The heartbeat signal may be detectable through any mechanism available to the closure partition 206, including a shared portion of the memory 126, a network connection, a firmware mailbox, or any other communication technique. The heartbeat signal may include any data, process, signal, or other technique that indicates that application processes are still executing on the host partition 204. The heartbeat signal may be generated continually, periodically, or responsively, for example in response to a poll request. In some embodiments, in block 704 the computing device 102a may monotonically increase the value of a well-defined location in the memory 126 that is accessible to both the host partition 204 and the closure partition 206. The well-defined memory location may be located within the volatile memory 128 or the persistent memory 130. After generating the heartbeat signal, the method loops back to block 702 to continue generating the heartbeat signal as long as the host partition 204 is active.

Figure 8:
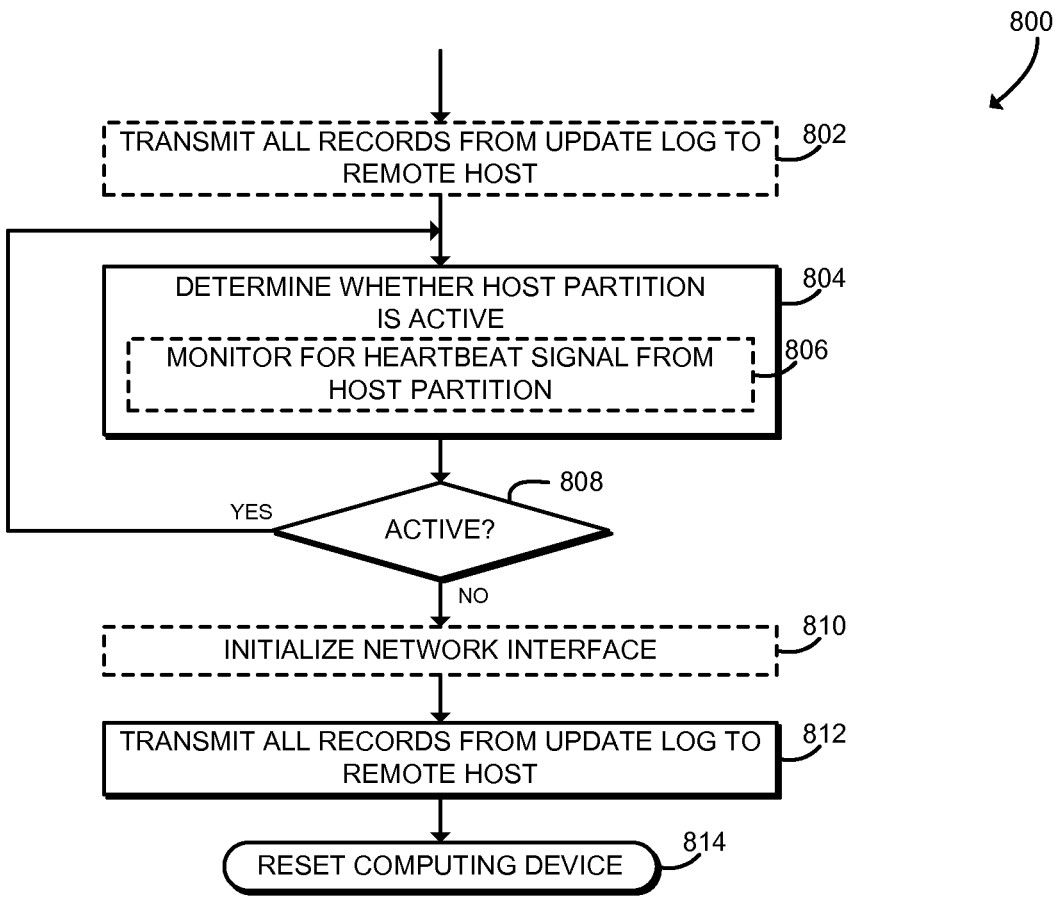
FIG. 8 is a simplified flow diagram of at least one embodiment of a method for failsafe transaction log replication that may be executed by the computing device of the system of FIGS. 1 and 2.

Referring now to FIG. 8, in use the computing device 102a may execute a method 800 for providing a closure service. The method 800 is executed using the closure partition 206 of the computing device 102a. The method 800 begins in block 802, in which, in some embodiments, the computing device 102a may transmit all records from the update log 226 to one or more remote computing devices 102b. For example, after recovering from a crash, the computing device 102a may transfer the records in order to allow the remote computing devices 102b to update their respective replica update logs 248.

In block 804, the computing device 102a determines whether the host partition 204 is active. The computing device 102a may use any technique to determine whether the host partition 204 is active. In some embodiments, in block 806 the computing device 102a may monitor for a heartbeat signal generated by the host partition 204. For example, the computing device 102a may monitor the value of a well-defined location in the memory 126 that the host partition 204 monotonically increases while active, as described above in connection with FIG. 7. In those embodiments, the computing device 102a may determine that the host partition 204 is no longer active when the value of the well-defined location in memory does not change over a predefined time interval. In block 808, the computing device 102a determines whether to branch based on whether the host partition 204 is active. If the host partition 204 is active, the method 800 loops back to block 804. If the host partition 204 is not active, the method 800 advances to block 810.

In block 810, in some embodiments, the computing device 102a may reset and initialize the network interface 134 for transmission. For example, in some embodiments, the computing device 102a may transfer control of the network interface 134 from the host partition 204 to the closure partition 206. Additionally or alternatively, the computing device 102a may initialize, transfer, or otherwise prepare a port 136 of the network interface 134 for use by the closure partition 206.

In block 812, the computing device 102a transmits all records from the update log 226 to the one or more remote computing devices 102b. The computing device 102a may transfer the records using a fast transmit engine such as a polling-based packet transport service of the closure partition 206. For example, the computing device 102a may use the Intel® Data Plane Development Kit (DPDK) or other network engine to transmit the records. The fast transmit engine may reduce or eliminate in-memory copies, avoid interrupt servicing overhead, or perform other operations to increase the transmission speed and/or efficiency of the computing device 102a. Typically, the update log 226 will include a relatively small number of records to be transferred by the closure partition 206, because the host partition 204 may have been streaming the records to the remote computing devices 102b until the host partition 204 became unavailable. Thus, the computing device 102a may transfer records to the remote computing device(s) 102b within a fraction of a second, allowing the computing device 102a to meet high-availability requirements.

In block 814, the computing device 102a is reset by the closure partition 206. Resetting the computing device 102a may allow the host partition 204 and/or the closure partition 206 to recover the state data 224 of the persistent memory 130 using the update log 226, and allow the computing device 102a to resume providing services. Additionally or alternatively, in some embodiments the computing device 102a may perform recovery tasks other than restarting; for example, sending a notification to a failover machine, system administrator, or other entity. In some embodiments, a recovery task may also include notifying other machines in a cluster that the present machine is disconnecting from the cluster, so that other actions such as load rebalancing may be initiated by a cluster management service (not shown).

Figure 9:
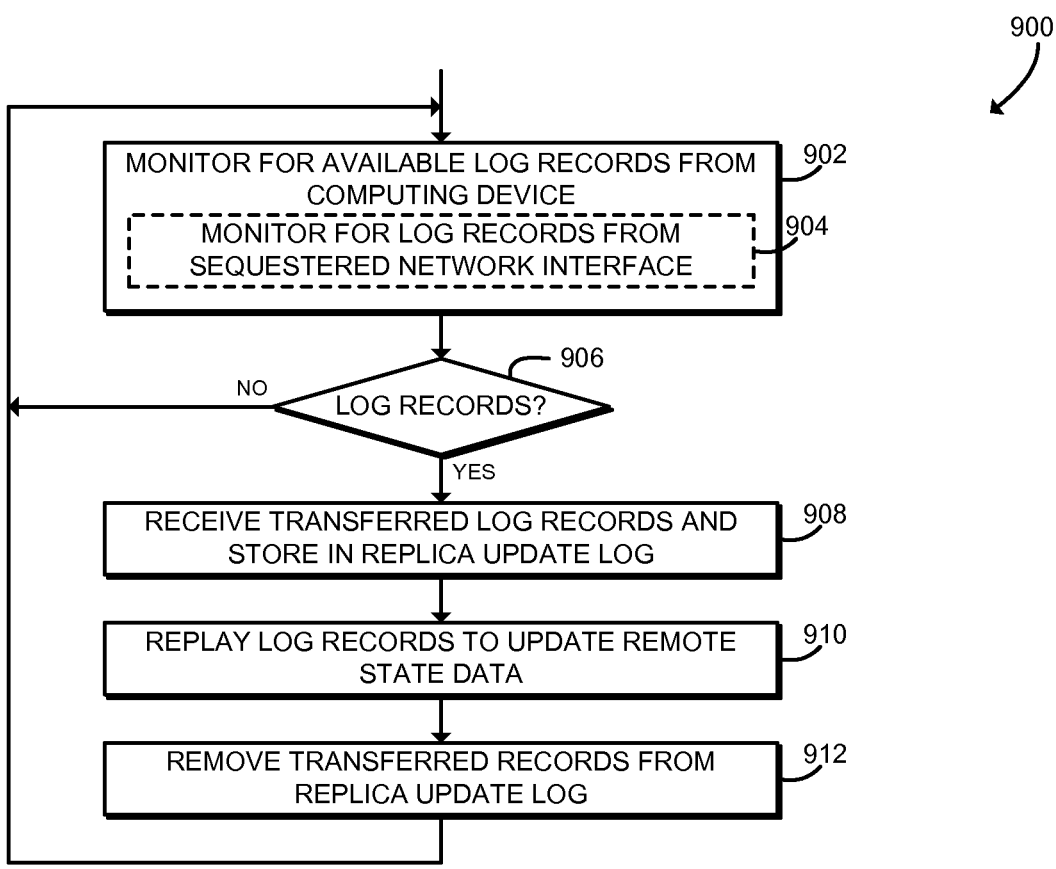
FIG. 9 is a simplified flow diagram of at least one embodiment of a method for receiving replicated transaction log records that may be executed by another computing device of the system of FIGS. 1 and 2.

Referring now to FIG. 9, in use a remote computing device 102*b* may execute a method 900 for replicating update log data. The method 900 begins in block 902, in which the remote computing device 102*b* monitors for available log records to receive from the computing device 102*a*. Those transfers may originate from the host partition 204 or the closure partition 206 of the computing device 102*a*. The remote computing device 102*b* may use any method to determine whether log records are available to transfer, including polling the computing device 102*a*, listening on a port for the computing device 102*a*, or other techniques. In some embodiments, in block 904 the remote computing device 102*b* may monitor for transfers available from a sequestered network interface of the computing device 102*a*. For example, the remote computing device 102*b* may monitor a port 136*b* of the network interface 134 that has been isolated or sequestered for use by the closure partition 206. In block 906, the remote computing device 102*b* determines whether log records are available. If not, the method 900 loops back to block 902 to continue monitoring. If log records are available, the method 900 advances to block 908.

In block 908, the remote computing device 102*b* receives the transferred log records from the computing device 102*a* and stores the log records in the replica update log 248. The replica update log 248 may include records, pointers, and other data structures similar or identical to the update log 226. For example, the replica update log 248 may include a head pointer, tail pointer, and a circular buffer to store the transferred log records. The remote computing device 102*b* may receive the records using a fast receive engine such as a polling-based packet transport service. For example, the remote computing device 102*b* may use the Intel® Data Plane Development Kit (DPDK) or other network engine to receive the records. The fast receive engine may reduce or eliminate in-memory copies, avoid interrupt servicing overhead, or perform other operations to increase the transmission speed and/or efficiency of the remote computing device 102*b*. The remote computing device 102*b* may receive any number of log records. For example, the remote computing device 102*b* may receive a group of records transmit by the host partition 204 or all of the remaining records in the update log 226 from the closure partition 206.

In block 910, the remote computing device 102*b* replays the log records from the replica update log 248 to update the remote state data 246. Because the replica update log 248 is already stored in the persistent memory 130, the remote computing device 102*b* may replay the log records when convenient or efficient, including after a crash of the remote computing device 102*b*. Thus, there is no need for the replica update log 248 to be replayed within a guaranteed time period. Accordingly, in some embodiments the remote state data 246 may be stored in a traditional data storage device 132, a storage-area network, or other I/O-bound storage. Additionally or alternatively, in some embodiments the remote state data 246 may also be stored in the persistent memory 130.

In block 912, after replaying the log records, the remote computing device 102*b* removes the transferred log records from the replica update log 248. The remote computing device 102*b* may update data structures related to the replica update log 248 to indicate that the records have been transferred, for example by advancing a head pointer. Similar to as described above, removing log records after they have been replayed may improve performance of the remote computing device 102*b* when replaying the replica update log 248 to recover from a crash.

EXAMPLES

Illustrative examples of the technologies disclosed herein are provided below. An embodiment of the technologies may include any one or more, and any combination of, the examples described below.

Example 1 includes a computing device for durable data replication, the computing device comprising a persistent memory to store a persistent memory state and an update log; an isolation module to isolate a closure partition from a host partition; a persistent memory module of the host partition to write a transaction record corresponding to a persistent memory state change to the update log; a replication module of the host partition to transmit the transaction record to a remote computing device in response to (i) writing of the transaction record to the update log and (ii) the host partition being active after the writing of the transaction record; and a closure module of the closure partition, the closure module to: determine whether the host partition is active after the writing of the transaction record; transmit the update log including the transaction record to the remote computing device in response to a determination that the host partition is not active; and restart the computing device in response to transmission of the update log and the determination that the host partition is not active.

Example 2 includes the subject matter of Example 1, and wherein the persistent memory module is further to write the persistent memory state change to the persistent memory in response to the writing of the transaction record to the update log and the host partition being active after the writing of the transaction record.

Example 3 includes the subject matter of any of Examples 1 and 2, and wherein the persistent memory module is further to remove the transaction record from the update log in response to transmission of the transaction record by the host partition.

Example 4 includes the subject matter of any of Examples 1-3, and wherein the replication module further includes a polling-based packet transport service to transmit the transaction record.

Example 5 includes the subject matter of any of Examples 1-4, and wherein the persistent memory module is further to determine whether the update log includes capacity to store the transaction record; and wherein to write the transaction record comprises to write the transaction record in response to a determination that the update log includes the capacity to store the transaction record.

Example 6 includes the subject matter of any of Examples 1-5, and wherein the closure module comprises a polling-based packet transport service to transmit the transaction record.

Example 7 includes the subject matter of any of Examples 1-6, and wherein to isolate the closure partition comprises to sequester at least one processor core of a plurality of processor cores of the computing device to the closure partition; and assign the remainder of the plurality of processor cores to the host partition; wherein the at least one sequestered processor core is inaccessible to the host partition and the remainder of the plurality of processor cores is inaccessible to the closure partition.

Example 8 includes the subject matter of any of Examples 1-7, and wherein to sequester the at least one processor core comprises to sequester the at least one processor core using firmware of the computing device.

Example 9 includes the subject matter of any of Examples 1-8, and wherein to sequester the at least one processor core comprises to isolate the at least one processor core using an application processor boot function of the computing device.

Example 10 includes the subject matter of any of Examples 1-9, and wherein to isolate the closure partition from the host partition comprises to dedicate a first network interface for use by the host partition; and dedicate a second network interface for use by the closure partition.

Example 11 includes the subject matter of any of Examples 1-10, and wherein the closure module is further to transfer a network interface of the computing device from the host partition to the closure partition in response to the determination that the host partition is not active and prior to transmission of the transaction record.

Example 12 includes the subject matter of any of Examples 1-11, and wherein to write the transaction record comprises to write a transaction start record; write a state update record to correspond to the persistent memory state change; and write a transaction end record.

Example 13 includes the subject matter of any of Examples 1-12, and wherein the transaction start record comprises a transaction identifier, and the transaction end record comprises the transaction identifier.

Example 14 includes the subject matter of any of Examples 1-13, and wherein the state update record comprises the transaction identifier, a memory address associated with a location in the persistent memory, a previous value of the location in the persistent memory, and a new value of the location in the persistent memory.

Example 15 includes the subject matter of any of Examples 1-14, and wherein the persistent memory module is further to reconstruct a correct persistent memory state based on the update log in response to a restart of the computing device.

Example 16 includes the subject matter of any of Examples 1-15, and further including a heartbeat module of the host partition to generate a heartbeat signal detectable by the closure partition; wherein to determine whether the host partition is active comprises to determine whether the heartbeat signal is active.

Example 17 includes the subject matter of any of Examples 1-16, and wherein to generate the heartbeat signal comprises to monotonically increase a value stored in a memory location accessible to the host partition and to the closure partition.

Example 18 includes a computing device for distributed data durability, the computing device comprising a persistent memory to store a replica update log; and a replication receipt module to: receive a transaction record corresponding to a persistent memory state change from another computing device; store the transaction record in the replica update log; replay the transaction record to apply the persistent memory state change to a remote state data copy of the computing device in response to storing of the transaction record; and remove the transaction record from the replica update log in response to replaying of the transaction record.

Example 19 includes the subject matter of Example 18, and wherein to replay the transaction record comprises to replay the transaction record to apply the persistent memory state change to the remote state data copy stored in the persistent memory of the computing device.

Example 20 includes the subject matter of any of Examples 18 and 19, and wherein to replay the transaction record comprises to replay the transaction record to apply the persistent memory state change to the remote state data copy stored in a data storage device of the computing device.

Example 21 includes the subject matter of any of Examples 18-20, and wherein to receive the transaction record comprises to receive the transaction record from a host partition of the other computing device.

Example 22 includes the subject matter of any of Examples 18-21, and wherein to receive the transaction record comprises to receive the transaction record from a closure partition of the other computing device.

Example 23 includes the subject matter of any of Examples 18-22, and wherein to receive the transaction record comprises to receive the transaction record from a host partition of the other computing device; and the replication receipt module is further to receive a second transaction record corresponding to a second persistent memory state change from a closure partition of the other computing device; store the second transaction record in the replica update log; replay the second transaction record to apply the second persistent memory state change to the remote state data copy in response to storing of the second transaction record; and remove the second transaction record from the replica update log in response to replaying of the second transaction record.

Example 24 includes the subject matter of any of Examples 18-23, and wherein the replication receipt module comprises a polling-based packet transport service to receive the transaction record.

Example 25 includes a method for durable data replication, the method comprising isolating, by a computing device, a closure partition from a host partition; writing, by the host partition, a transaction record corresponding to a persistent memory state change to an update log stored in persistent memory of the computing device; determining, by the closure partition, whether the host partition is active after writing the transaction record; transmitting, by the host partition, the transaction record to a remote computing device in response to writing the transaction record to the update log and the host partition being active after writing the transaction record; transmitting, by the closure partition, the update log including the transaction record to the remote computing device in response to determining that the host partition is not active; and restarting, by the closure partition, the computing device in response to transmitting the update log and determining that the host partition is not active.

Example 26 includes the subject matter of Example 25, and further including writing, by the host partition, the persistent memory state change to the persistent memory in response to writing the transaction record to the update log and the host partition being active after writing the transaction record.

Example 27 includes the subject matter of any of Examples 25 and 26, and further including removing, by the host partition, the transaction record from the update log in response to the host partition transmitting the transaction record.

Example 28 includes the subject matter of any of Examples 25-27, and wherein transmitting the transaction record by the host partition comprises transmitting the transaction record using a polling-based packet transport service of the host partition.

Example 29 includes the subject matter of any of Examples 25-28, and further including determining, by the host partition, whether the update log includes capacity to store the transaction record; wherein writing the transaction record comprises writing the transaction record in response to determining that the update log includes the capacity to store the transaction record.

Example 30 includes the subject matter of any of Examples 25-29, and wherein transmitting the transaction record by the closure partition comprises transmitting the transaction record using a polling-based packet transport service of the closure partition.

Example 31 includes the subject matter of any of Examples 25-30, and wherein isolating the closure partition comprises sequestering at least one processor core of a plurality of processor cores of the computing device to the closure partition; and assigning the remainder of the plurality of processor cores to the host partition; wherein the at least one sequestered processor core is inaccessible to the host partition and the remainder of the plurality of processor cores is inaccessible to the closure partition.

Example 32 includes the subject matter of any of Examples 25-31, and wherein sequestering the at least one processor core comprises sequestering the at least one processor core using firmware of the computing device.

Example 33 includes the subject matter of any of Examples 25-32, and wherein sequestering the at least one processor core comprises isolating the at least one processor core using an application processor boot function of the computing device.

Example 34 includes the subject matter of any of Examples 25-33, and wherein isolating the closure partition from the host partition comprises dedicating a first network interface for use by the host partition; and dedicating a second network interface for use by the closure partition.

Example 35 includes the subject matter of any of Examples 25-34, and further including transferring a network interface of the computing device from the host partition to the closure partition in response to determining that the host partition is not active and prior to transmitting the transaction record.

Example 36 includes the subject matter of any of Examples 25-35, and wherein writing the transaction record comprises writing a transaction start record; writing a state update record corresponding to the persistent memory state change; and writing a transaction end record.

Example 37 includes the subject matter of any of Examples 25-36, and wherein the transaction start record comprises a transaction identifier, and the transaction end record comprises the transaction identifier.

Example 38 includes the subject matter of any of Examples 25-37, and wherein the state update record comprises the transaction identifier, a memory address associated with a location in the persistent memory, a previous value of the location in the persistent memory, and a new value of the location in the persistent memory.

Example 39 includes the subject matter of any of Examples 25-38, and further including reconstructing, by the host partition, a correct persistent memory state based on the update log in response to restarting the computing device.

Example 40 includes the subject matter of any of Examples 25-39, and further including generating, by the host partition, a heartbeat signal detectable by the closure partition; wherein determining whether the host partition is active comprises determining whether the heartbeat signal is active.

Example 41 includes the subject matter of any of Examples 25-40, and wherein generating the heartbeat signal comprises monotonically increasing a value stored in a memory location accessible to the host partition and to the closure partition.

Example 42 includes a method for distributed data durability, the method comprising receiving, by a computing device, a transaction record corresponding to a persistent memory state change from another computing device; storing, by the computing device, the transaction record in a replica update log stored in a persistent memory of the computing device; replaying, by the computing device, the transaction record to apply the persistent memory state change to a remote state data copy of the computing device in response to storing the transaction record; and removing, by the computing device, the transaction record from the replica update log in response to replaying the transaction record.

Example 43 includes the subject matter of Example 42, and wherein replaying the transaction record comprises replaying the transaction record to apply the persistent memory state change to the remote state data copy stored in the persistent memory of the computing device.

Example 44 includes the subject matter of any of Examples 42 and 43, and wherein replaying the transaction record comprises replaying the transaction record to apply the persistent memory state change to the remote state data copy stored in a data storage device of the computing device.

Example 45 includes the subject matter of any of Examples 42-44, and wherein receiving the transaction record comprises receiving the transaction record from a host partition of the other computing device.

Example 46 includes the subject matter of any of Examples 42-45, and wherein receiving the transaction record comprises receiving the transaction record from a closure partition of the other computing device.

Example 47 includes the subject matter of any of Examples 42-46, and wherein receiving the transaction record comprises receiving the transaction record from a host partition of the other computing device, the method further including receiving, by the computing device, a second transaction record corresponding to a second persistent memory state change from a closure partition of the other computing device; storing, by the computing device, the second transaction record in the replica update log; replaying, by the computing device, the second transaction record to apply the second persistent memory state change to the remote state data copy in response to storing the second transaction record; and removing, by the computing device, the second transaction record from the replica update log in response to replaying the second transaction record.

Example 48 includes the subject matter of any of Examples 42-47, and wherein receiving the transaction record comprises receiving the transaction record using a polling-based packet transport service of the computing device.

Example 49 includes a computing device comprising a processor; and a memory having stored therein a plurality of instructions that when executed by the processor cause the computing device to perform the method of any of Examples 25-48.

Example 50 includes one or more machine readable storage media comprising a plurality of instructions stored thereon that in response to being executed result in a computing device performing the method of any of Examples 25-48.

Example 51 includes a computing device comprising means for performing the method of any of Examples 25-48.

Example 52 includes a computing device for durable data replication, the computing device comprising means for isolating a closure partition from a host partition; means for writing, by the host partition, a transaction record corresponding to a persistent memory state change to an update log stored in persistent memory of the computing device; means for determining, by the closure partition, whether the host partition is active after writing the transaction record; means for transmitting, by the host partition, the transaction record to a remote computing device in response to writing the transaction record to the update log and the host partition being active after writing the transaction record; means for transmitting, by the closure partition, the update log including the transaction record to the remote computing device in response to determining that the host partition is not active; and means for restarting, by the closure partition, the computing device in response to transmitting the update log and determining that the host partition is not active.

Example 53 includes the subject matter of Example 52, and further including means for writing, by the host partition, the persistent memory state change to the persistent memory in response to writing the transaction record to the update log and the host partition being active after writing the transaction record.

Example 54 includes the subject matter of any of Examples 52 and 53, and further including means for removing, by the host partition, the transaction record from the update log in response to the host partition transmitting the transaction record.

Example 55 includes the subject matter of any of Examples 52-54, and wherein the means for transmitting the transaction record by the host partition comprises means for transmitting the transaction record using a polling-based packet transport service of the host partition.

Example 56 includes the subject matter of any of Examples 52-55, and further including means for determining, by the host partition, whether the update log includes capacity to store the transaction record; wherein the means for writing the transaction record comprises means for writing the transaction record in response to determining that the update log includes the capacity to store the transaction record.

Example 57 includes the subject matter of any of Examples 52-56, and wherein the means for transmitting the transaction record by the closure partition comprises means for transmitting the transaction record using a polling-based packet transport service of the closure partition.

Example 58 includes the subject matter of any of Examples 52-57, and wherein the means for isolating the closure partition comprises means for sequestering at least one processor core of a plurality of processor cores of the computing device to the closure partition; and means for assigning the remainder of the plurality of processor cores to the host partition; wherein the at least one sequestered processor core is inaccessible to the host partition and the remainder of the plurality of processor cores is inaccessible to the closure partition.

Example 59 includes the subject matter of any of Examples 52-58, and wherein the means for sequestering the at least one processor core comprises means for sequestering the at least one processor core using firmware of the computing device.

Example 60 includes the subject matter of any of Examples 52-59, and wherein the means for sequestering the at least one processor core comprises means for isolating the at least one processor core using an application processor boot function of the computing device.

Example 61 includes the subject matter of any of Examples 52-60, and wherein the means for isolating the closure partition from the host partition comprises means for dedicating a first network interface for use by the host partition; and means for dedicating a second network interface for use by the closure partition.

Example 62 includes the subject matter of any of Examples 52-61, and further including means for transferring a network interface of the computing device from the host partition to the closure partition in response to determining that the host partition is not active and prior to transmitting the transaction record.

Example 63 includes the subject matter of any of Examples 52-62, and wherein the means for writing the transaction record comprises means for writing a transaction start record; means for writing a state update record corresponding to the persistent memory state change; and means for writing a transaction end record.

Example 64 includes the subject matter of any of Examples 52-63, and wherein the transaction start record comprises a transaction identifier, and the transaction end record comprises the transaction identifier.

Example 65 includes the subject matter of any of Examples 52-64, and wherein the state update record comprises the transaction identifier, a memory address associated with a location in the persistent memory, a previous value of the location in the persistent memory, and a new value of the location in the persistent memory.

Example 66 includes the subject matter of any of Examples 52-65, and further including means for reconstructing, by the host partition, a correct persistent memory state based on the update log in response to restarting the computing device.

Example 67 includes the subject matter of any of Examples 52-66, and further including means for generating, by the host partition, a heartbeat signal detectable by the closure partition; wherein the means for determining whether the host partition is active comprises means for determining whether the heartbeat signal is active.

Example 68 includes the subject matter of any of Examples 52-67, and wherein the means for generating the heartbeat signal comprises means for monotonically increasing a value stored in a memory location accessible to the host partition and to the closure partition.

Example 69 includes a computing device for distributed data durability, the computing device comprising means for receiving a transaction record corresponding to a persistent memory state change from another computing device; means for storing the transaction record in a replica update log stored in a persistent memory of the computing device; means for replaying the transaction record to apply the persistent memory state change to a remote state data copy of the computing device in response to storing the transaction record; and means for removing the transaction record from the replica update log in response to replaying the transaction record.

Example 70 includes the subject matter of Example 69, and wherein the means for replaying the transaction record comprises means for replaying the transaction record to apply the persistent memory state change to the remote state data copy stored in the persistent memory of the computing device.

Example 71 includes the subject matter of any of Examples 69 and 70, and wherein the means for replaying the transaction record comprises means for replaying the transaction record to apply the persistent memory state change to the remote state data copy stored in a data storage device of the computing device.

Example 72 includes the subject matter of any of Examples 69-71, and wherein the means for receiving the transaction record comprises means for receiving the transaction record from a host partition of the other computing device.

Example 73 includes the subject matter of any of Examples 69-72, and wherein the means for receiving the transaction record comprises means for receiving the transaction record from a closure partition of the other computing device.

Example 74 includes the subject matter of any of Examples 69-73, and wherein the means for receiving the transaction record comprises means for receiving the transaction record from a host partition of the other computing device, the computing device further comprising: means for receiving a second transaction record corresponding to a second persistent memory state change from a closure partition of the other computing device; means for storing the second transaction record in the replica update log; means for replaying the second transaction record to apply the second persistent memory state change to the remote state data copy in response to storing the second transaction record; and means for removing the second transaction record from the replica update log in response to replaying the second transaction record.

Example 75 includes the subject matter of any of Examples 69-74, and wherein the means for receiving the transaction record comprises means for receiving the transaction record using a polling-based packet transport service of the computing device.

The invention claimed is:

1. A computing device for durable data replication, the computing device comprising:
   a persistent memory to store a persistent memory state and an update log;
   an isolation module to isolate a closure partition from a host partition;
   a persistent memory module of the host partition to write a transaction record corresponding to a persistent memory state change to the update log;
   a replication module of the host partition to transmit the transaction record to a remote computing device in response to (i) writing of the transaction record to the update log and (ii) the host partition being active after the writing of the transaction record; and
   a closure module of the closure partition, the closure module to:
      determine whether the host partition is active after the writing of the transaction record;
      transmit the update log including the transaction record to the remote computing device in response to a determination that the host partition is not active; and
      restart the computing device in response to transmission of the update log and the determination that the host partition is not active.

2. The computing device of claim 1, wherein the replication module further comprises a polling-based packet transport service to transmit the transaction record.

3. The computing device of claim 1, wherein the closure module comprises a polling-based packet transport service to transmit he transaction record.

4. The computing device of claim 1, wherein to isolate the closure partition comprises to:
   sequester at least one processor core of a plurality of processor cores of the computing device to the closure partition; and
   assign the remainder of the plurality of processor cores to the host partition;
   wherein the at least one sequestered processor core is inaccessible to the host partition and the remainder of the plurality of processor cores is inaccessible to the closure partition.

5. The computing device of claim 4, wherein to sequester the at least one processor core comprises to sequester the at least one processor core using firmware of the computing device.

6. The computing device of claim 4, wherein to sequester the at least one processor core comprises to isolate the at least one processor core using an application processor boot function of the computing device.

7. The computing device of claim 1, wherein to isolate the closure partition from the host partition comprises to:
   dedicate a first network interface for use by the host partition; and
   dedicate a second network interface for use by the closure partition.

8. The computing device of claim 1, wherein the closure module is further to transfer a network interface of the computing device from the host partition to the closure partition in response to the determination that the host partition is not active and prior to transmission of the transaction record.

9. The computing device of claim 1, wherein to write the transaction record comprises to:
   write a transaction start record, the transaction start record to include a transaction identifier;
   write a state update record to correspond to the persistent memory state change, the state update record to include the transaction identifier, a memory address associated with a location in the persistent memory, a previous value of the location in the persistent memory, and a new value of the location in the persistent memory; and
   write a transaction end record, the transaction end record to include the transaction identifier.

10. The computing device of claim 1, wherein the persistent memory module is further to reconstruct a correct persistent memory state based on the update log in response to a restart of the computing device.

11. One or more non-transitory computer-readable storage media comprising a plurality of instructions that in response to being executed cause a computing device to:
   isolate a closure partition from a host partition;
   write, by the host partition, a transaction record corresponding to a persistent memory state change to an update log stored in persistent memory of the computing device;
   determine, by the closure partition, whether the host partition is active after writing the transaction record;
   transmit, by the host partition, the transaction record to a remote computing device in response to writing the transaction record to the update log and the host partition being active after writing the transaction record;
   transmit, by the closure partition, the update log including the transaction record to the remote computing device in response to determining that the host partition is not active; and
   restart, by the closure partition, the computing device in response to transmitting the update log and determining that the host partition is not active.

12. The one or more non-transitory computer-readable storage media of claim 11, wherein to transmit the transaction record by the host partition comprises to transmit the transaction record using a polling-based packet transport service of the host partition.

13. The one or more non-transitory computer-readable storage media of claim 11, wherein to transmit the transaction record by the closure partition comprises to transmit the transaction record using a polling-based packet transport service of the closure partition.

14. The one or more non-transitory computer-readable storage media of claim 11, wherein to isolate the closure partition comprises to:
   sequester at least one processor core of a plurality of processor cores of the computing device to the closure partition; and
   assign the remainder of the plurality of processor cores to the host partition;
   wherein the at least one sequestered processor core is inaccessible to the host partition and the remainder of the plurality of processor cores is inaccessible to the closure partition.

15. The one or more non-transitory computer-readable storage media of claim 14, wherein to sequester the at least one processor core comprises to sequester the at least one processor core using firmware of the computing device.

16. The one or more non-transitory computer-readable storage media of claim 14, wherein to sequester the at least one processor core comprises to isolate the at least one processor core using an application processor boot function of the computing device.

17. The one or more non-transitory computer-readable storage media of claim 11, wherein to write the transaction record comprises to:
- write a transaction start record, the transaction start record including a transaction identifier;
- write a state update record corresponding to the persistent memory state change, the state update record including the transaction identifier, a memory address associated with a location in the persistent memory, a previous value of the location in the persistent memory, and a new value of the location in the persistent memory; and
- write a transaction end record, the transaction end record including the transaction identifier.

18. The one or more non-transitory computer-readable storage media of claim 11, further comprising a plurality of instructions that in response to being executed cause the computing device to reconstruct, by the host partition, a correct persistent memory state based on the update log in response to restarting the computing device.

19. A method for durable data replication, the method comprising:
- isolating, by a computing device, a closure partition from a host partition;
- writing, by the host partition, a transaction record corresponding to a persistent memory state change to an update log stored in persistent memory of the computing device;
- determining, by the closure partition, whether the host partition is active after writing the transaction record;
- transmitting, by the host partition, the transaction record to a remote computing device in response to writing the transaction record to the update log and the host partition being active after writing the transaction record;
- transmitting, by the closure partition, the update log including the transaction record to the remote computing device in response to determining that the host partition is not active; and
- restarting, by the closure partition, the computing device in response to transmitting the update log and determining that the host partition is not active.

20. The method of claim 19, wherein transmitting the transaction record by the host partition comprises transmitting the transaction record using a polling-based packet transport service of the host partition.

21. The method of claim 19, wherein transmitting the transaction record by the closure partition comprises transmitting the transaction record using a polling-based packet transport service of the closure partition.

22. The method of claim 19, wherein isolating the closure partition comprises:
- sequestering at least one processor core of a plurality of processor cores of the computing device to the closure partition; and
- assigning the remainder of the plurality of processor cores to the host partition;
- wherein the at least one sequestered processor core is inaccessible to the host partition and the remainder of the plurality of processor cores is inaccessible to the closure partition.

23. The method of claim 22, wherein sequestering the at least one processor core comprises sequestering the at least one processor core using firmware of the computing device.

24. The method of claim 22, wherein sequestering the at least one processor core comprises isolating the at least one processor core using an application processor boot function of the computing device.

25. The method of claim 19, wherein writing the transaction record comprises:
- writing a transaction start record wherein the transaction start record comprises a transaction identifier;
- writing a state update record corresponding to the persistent memory state change, wherein the state update record comprises the transaction identifier, a memory address associated with a location in the persistent memory, a previous value of the location in the persistent memory, and a new value of the location in the persistent memory; and
- writing a transaction end record, wherein the transaction end record comprises the transaction identifier.

* * * * *